United States Patent [19]

Blanck et al.

[11] 4,360,504

[45] Nov. 23, 1982

[54] SIMULTANEOUS DESTRUCTION OF TRACE COMPONENTS IN THE REACTION OFF-GAS FROM THE SYNTHESIS OF MELAMINE

[75] Inventors: Klaus Blanck, Heidelberg; Winfried Dethlefsen, Mannheim; Anton Jungbauer, Ludwigshafen; Bernd Leutner, Frankenthal; Ernst-Juergen Schier, Altleiningen; Hans-Ulrich Schlimper, Speyer; Hans H. Schneehage, Weisenheim, all of Fed. Rep. of Germany

[73] Assignee: BASF Aktiengesellschaft, Fed. Rep. of Germany

[21] Appl. No.: 307,669

[22] Filed: Oct. 1, 1981

[30] Foreign Application Priority Data

Nov. 3, 1980 [DE] Fed. Rep. of Germany ....... 3041324

[51] Int. Cl.³ .............................................. B01D 53/36
[52] U.S. Cl. ..................... 423/236; 423/239; 423/245; 423/355; 423/415 A; 544/201
[58] Field of Search .............. 423/210, 231, 236, 239, 423/245, 355, 415 A; 544/200, 201

[56] References Cited

U.S. PATENT DOCUMENTS

| | | | |
|---|---|---|---|
| 2,780,513 | 2/1957 | Marzluff | 423/236 |
| 2,817,580 | 12/1957 | Marsh et al. | 423/236 |
| 3,321,603 | 4/1967 | Hamprecht et al. | 260/555 |
| 3,386,999 | 6/1968 | Manes | 544/201 |
| 3,723,430 | 3/1973 | Kokubo et al. | 544/201 |
| 3,878,289 | 4/1975 | Beavon | 423/219 |
| 4,120,667 | 10/1978 | Gettert et al. | 55/48 |

FOREIGN PATENT DOCUMENTS

| | | |
|---|---|---|
| 1204079 | 3/1964 | Fed. Rep. of Germany . |
| 2341650 | 3/1974 | Fed. Rep. of Germany . |
| 2352425 | 5/1974 | Fed. Rep. of Germany . |
| 2646804 | 4/1978 | Fed. Rep. of Germany . |
| 53-5065 | 1/1978 | Japan . |

*Primary Examiner*—Earl C. Thomas
*Attorney, Agent, or Firm*—Keil & Witherspoon

[57] ABSTRACT

The reaction off-gas from the synthesis of melamine consists, after separating off the melamine, mainly of ammonia and carbon dioxide, with traces of hydrogen cyanide, isocyanic acid, urea and residual melamine. To remove these trace components, the off-gas is passed over a catalyst, containing copper oxide and/or iron oxide, in the presence of steam at from 100° to 500° C.

8 Claims, No Drawings

SIMULTANEOUS DESTRUCTION OF TRACE COMPONENTS IN THE REACTION OFF-GAS FROM THE SYNTHESIS OF MELAMINE

The present invention relates to a process for the simultaneous destruction of the trace components hydrogen cyanide, isocyanic acid, urea and melamine in the reaction off-gas, consisting mainly of ammonia and carbon dioxide, which are left after thermal conversion of urea to melamine and isolation of the melamine.

It is known that melamine can be prepared by heating urea or its thermal decomposition products at from 350° to 450° C., under atmospheric pressure or superatmospheric pressure of up to about 10 bar, in the presence of a catalyst and of added ammonia or of a gas mixture containing ammonia, such as an ammonia/carbon dioxide mixture, for example the off-gas from the actual synthesis of malamine.

The melamine vapor can be separated out of the reaction gases by, for example, fractional condensation as described in German Published Application No. DAS 1,204,679, namely cooling the gases to 150°–250° C. Any unconverted urea can be removed from the reaction gases by washing with a urea melt. The off-gas purified in this way consists mainly of ammonia and carbon dioxide but still contains traces of hydrogen cyanide, urea, isocyanic acid and melamine.

This off-gas must be re-used so as to utilize the ammonia which it contains and which is its valuable component. Possible re-uses include recycling the gas mixture to the synthesis of urea or converting the ammonia to ammonium salts by reaction with acids.

It is also known to separate the gas mixture into its main components, namely ammonia and carbon dioxide, in order to isolate the ammonia in pure form (cf. German Laid-Open Application No. DOS 2,646,804).

However, in all these possible methods of converting or working up the off-gas from the synthesis of melamine, the abovementioned compounds, present in traces in the off-gas, interfere either by contaminating the products isolated or by accumulating in the course of working up the off-gas. Accordingly, these traces must be removed before further utilization of the off-gas.

In principle it is conceivable to remove these traces conjointly or successively by washing the gas, but this approach must be expected to present a number of difficulties. First, wash solutions also absorb ammonia and carbon dioxide physically and chemically, so that these two main components of the melamine off-gas would be at least partially lost to further commercial utilization, unless they were recovered in an additional process stage. Furthermore, the toxic compounds hydrogen cyanide and isocyanic acid have to be removed from the wash solutions in order to prevent their build-up. A further difficulty is that the off-gas, consisting essentially of $NH_3$ and $CO_2$, condenses to solid ammonium carbamate when the temperature drops below 100° C., whilst on the other hand, if temperatures above 100 C. are used to prevent such condensation, the composition and effectiveness of the wash solution undergoes an adverse change.

Finally, a large number of processes have been disclosed in which the hydrogen cyanide contained in the gas mixtures is hydrolytically decomposed into ammonia and carbon monoxide in the presence of a catalyst, in accordance with the equation $$HCN + H_2O \rightarrow NH_3 + CO$$

German Laid-Open Application No. DOS 2,352,425 discloses a process for removing hydrogen cyanide and ammonia from gas mixtures containing hydrogen sulfide, by treatment, at above 538° C., in the presence of a catalyst which contains not less than one sulfide of a metal of group Va, VIa or the third period of group VIII of the periodic table, or of a rare earth, the sulfide being on a carrier. In this process, the hydrogen cyanide is first hydrolyzed to ammonia, and the latter is then decomposed to its elements. Such a process is of course unsuitable for treating the melamine synthesis off-gas, which contains a large amount of ammonia, since the process would have the undesirable effect of degrading this ammonia to unutilizable nitrogen.

German Laid-Open Application No. DOS 2,341,650 describes a further process for removing hydrogen cyanide from gases, especially from gases containing hydrogen sulfide, for example coke oven gas, wherein the gas is treated, at >93° C., with sufficient water to hydrolyze the hydrogen cyanide, in the presence of a catalyst which contains not less than one alkali metal hydroxide on alumina, silica, alumina/silica or a zeolite as the carrier.

U.S. Pat. No. 2,817,560 also describes a process for removing hydrogen cyanide from hydrogen sulfide, wherein the gas mixture is treated with steam at from 200° to 400° C. in the presence of a catalyst consisting of $\gamma$-A100H or $\gamma$-Al$_2$O$_3$.

Finally, Japanese Laid-Open Application No. 53/005,065 discloses a process in which the hydrogen cyanide contained in off-gas is first converted to ammonia and carbon monoxide in the presence of a hydrolysis catalyst, after which, in a second stage, the ammonia and carbon monoxide are oxidized to nitrogen and carbon dioxide in the presence of an oxidation catalyst. The hydrolysis catalyst employed is an oxidic catalyst which contains not less than one oxide of the elements aluminum, cerium, titanium, zirconium, magnesium, calcium, barium, sodium, potassium, molybdenum, vanadium, iron, cobalt, nickel, copper, manganese, silver and lanthanum. This process, again, can of course only be employed for off-gas which at most contains small amounts of ammonia, since the process provides that the ammonia formed by hydrolysis of the hydrogen cyanide is oxidized to nitrogen in a second stage.

Hitherto, no process has been disclosed for destroying the traces of hydrogen cyanide, isocyanic acid, urea and melamine contained in the reaction off-gas from the synthesis of melamine. Because of the high ammonia content of this off-gas and because the hydrolysis of the compounds contained therein also produces ammonia, it would, in view of the law of mass action, not have been expected that hydrolytic destruction of these trace compounds in the said reaction off-gas would be possible at all. Our own investigations have shown that the catalyst systems mentioned above exhibit satisfactory or good reactivity in respect of destruction of hydrogen cyanide in gas mixtures which are substantially free from ammonia and carbon dioxide, whilst as a rule their activity is entirely inadequate in the case of gas mixtures whose composition corresponds to that of the reaction off-gas from the synthesis of melamine. This is also true of the destruction of isocyanic acid, urea and melamine even in gas mixtures free from ammonia and carbon dioxide.

It is an object of the present invention to provide a process for simultaneously destroying the traces of hydrogen cyanide, isocyanic acid, urea and melamine present in the reaction off-gas, consisting mainly of ammonia and carbon dioxide, obtained from the thermal conversion of urea to melamine and after isolating the melamine, by which process the said trace components can be destroyed simply, effectively and continuously, in one step, without attacking the main components of the off-gas, namely carbon dioxide and especially ammonia.

We have found that this object is achieved if the reaction off-gas is passed over a catalyst, containing copper oxide and/or iron oxide, in the presence of steam at from 100° to 500° C.

The hydrogen cyanide content of the reaction off-gas from the synthesis of melamine is as a rule less than 1,000 mg/m$^3$ (STP), usually from 20 to 120 mg/m$^3$ (STP), the melamine content is as a rule less than 100 mg/m$^3$ (STP), usually 5–20 mg/m$^3$ (STP), and the urea and isocyanic acid content is as a rule less than 10,000 mg/m$^3$ (STP), usually 500–1,500 mg/m$^3$ (STP). At higher temperatures, urea decomposes to ammonia and isocyanic acid, and these can recombine to urea at lower temperatures, so that depending on the temperature of the reaction off-gas, either urea, or an isocyanic acid/ammonia mixture, or a mixture of all three, is present.

For hydrolytic destruction of the trace components mentioned, not less than the stoichiometric amount of steam must be present in the off-gas, so that the individual components are hydrolyzed in accordance with the equations $$HCN + H_2O \longrightarrow CO + NH_3 \qquad (1)$$

$$C_3N_3(NH_2)_3 + 6 H_2O \longrightarrow 3 CO_2 + 6 NH_3 \qquad (2)$$

$$CO(NH_2)_2 + H_2O \longrightarrow CO_2 + 2 NH_3 \text{ or} \qquad (3)$$

$$HNCO + H_2O \longrightarrow CO_2 + NH_3$$

Advantageously, an excess of steam is used in order to ensure complete hydrolysis of the trace components, i.e. the steam content employed in the reaction off-gas is not less than 10% above the stoichiometric amount. As a rule, the reaction off-gas contains sufficient steam to conform to this requirement; in particular, depending on the operating conditions, the off-gas contains from about 0.1 to 2.0% by volume of steam, whilst assuming the above maximum contents of trace components, 1% by volume of steam would suffice. Of course, an even higher steam content can also be employed. In the case of the reaction off-gas having too low a steam content it is therefore necessary to moisten the gas prior to the catalytic treatment. Of course, the catalytic treatment, according to the invention, of the reaction off-gas from the synthesis of melamine is not restricted to the above contents of trace components and can be operated, at appropriately increased steam contents, even if, for example in the event of an operating fault in the melamine synthesis, one or other component, or all components, are present in substantially higher concentrations.

The copper oxide and iron oxide catalysts, which can be CuO or Fe$_2$O$_3$ catalysts, can be employed as such or, advantageously, on a carrier. Where a catalyst containing copper oxide is used, it can happen that during operation the ammonia contained in large excess in the reaction off-gas converts the copper oxide at least partially to copper nitride.

Similarly, when an iron oxide catalyst is used, the Fe$_2$O$_3$ may be reduced to Fe$_3$O$_4$.

Depending on the type of reactor and on the desired gas throughput, the catalysts can be employed in the form of pills, extrudates, rings or beads of various diameters.

As a basic principle, the catalysts containing copper oxide are more active than those containing iron oxide as the sole active component. This means that in the case of supported catalysts, the latter can, for similar activity, contain smaller amounts of copper oxide. Thus, supported catalysts containing as little as 0.5% by weight of Cu are as active as catalysts containing 5% by weight of iron, under similar conditions. Copper-containing catalysts should advantageously contain not less than 0.5% by weight of copper, whilst catalysts in which iron oxide is the active component should advantageously contain not less than 5% by weight of Fe.

Suitable carriers are conventional ceramic oxides, such as alumina, titanium dioxide, zinc oxide, zirconium dioxide or their mixtures or compounds, such as spinels, alumosilicates, aluminas and hydrated aluminas. The catalysts can be prepared by impregnation or precipitation.

Where the catalyst is prepared by impregnation, the carrier is impregnated with a copper salt and/or iron salt, especially the nitrates, and is then dried and calcined at above 450° C.

In the case of precipitated catalysts, their preparation comprises the following steps: preparation of the metal salt solution, for example the solution of the nitrate of the particular metal, preparation of the starting solutions for the carrier, for example aluminum salt solutions, combination of the solutions and precipitation of the catalyst intermediate with a base such as sodium carbonate or a hydroxide, filtering-off and pressing-out the precipitate, molding the catalyst material, drying and calcining.

To improve the mechanical properties of the catalysts, it has proved advantageous if from 5 to 25% by weight of chromium oxide (Cr$_2$O$_3$) are added to, or incorporated into, the carrier composition.

The treatment of the reaction off-gas in accordance with the invention is preferably carried out at from 150° to 300° C. The space velocity can vary within wide limits and can be from 100 to 10,000 h$^{-1}$, converted to 1 bar and 0° C. The pressure at which the treatment according to the invention is carried out is not a critical parameter. As a rule, however, the pressure will only be sufficiently high to maintain gas flow and overcome the flow resistance of the catalyst in the reaction space.

A particularly preferred catalyst is a supported catalyst containing copper oxide equivalent to 4–5% by weight of copper and prepared by impregnating beads of γ- or χ-alumina.

Using the process according to the invention, it is possible substantially to remove the trace components hydrogen cyanide, isocyanic acid, urea and melamine from the melamine synthesis off-gas without at the same time destroying a significant proportion of the main components of the gas, namely carbon dioxide and especially ammonia. The catalysts are not poisoned by the components of the gas and accordingly have a life of several years. Other components which may occur in the reaction off-gas, such as methane, nitrogen, carbon monoxide, oxygen or argon, do not interfere with the process according to the invention.

EXAMPLE 1

A gas mixture resulting from the preparation of melamine from urea is passed through a tubular, heated furnace at a space velocity of 1,000 $h^{-1}$, under a gas pressure of 1.3 bar, the furnace entry temperature being 198° C. The furnace contains a precipitated copper oxide catalyst in the form of tablets of 4 mm diameter. The mean catalyst temperature is 250° C. The exact catalyst composition and other process parameters are shown in Table 1. The composition of the gas mixture upstream and downstream of the catalyst zone is determined by conventional photometric, volumetric and gas-chromatographic methods and gives values of 97, 90 and 85% for the destruction of HCN, of melamine and of (HNCO+urea), respectively.

grees of destruction of the subsidiary components to be removed from the off-gas.

The gas mixture which is taken off at the top of the reactor, at 245° C. and under a pressure of 1.9 bar, is virtually free from HCN, melamine, HNCO and urea and can be used for the synthesis of ammonium nitrate or of urea.

EXAMPLE 3

The water content of the off-gas from the synthesis of melamine is brought to 5% by volume by addition of steam. This gas mixture is then passed, at a space velocity of 1,200 $h^{-1}$, through a catalyst bed containing an impregnated catalyst with copper oxide as the active component which contains the equivalent of 3.5% by weight of copper on α-alumina beads as the carrier. At a mean catalyst temperature of 200° C., the destruction of the HCN, melamine, HNCO and urea subsidiary components, over a trial period of 6 months, is from 85 to 96%.

TABLE 1

|  |  | Example 1 | Example 2 | Example 3 |
|---|---|---|---|---|
| Average gas composition upstream of the catalyst zone: |  |  |  |  |
| Ammonia | (% by volume) | 66.4 | 69.0 | 67.7 |
| Carbon dioxide | " | 32.5 | 30.0 | 27.1 |
| Steam | " | 1.0 | 0.9 | 5.0 |
| Hydrogen cyanide | (mg/m$^3$)(STP)) | 67 | 100 | 70 |
| Melamine | " | 2 | 3 | 16 |
| Isocyanic acid + urea | " | 500 | 1,350 | 1,400 |
| Average gas composition downstream of the catalyst zone: |  |  |  |  |
| Ammonia | (% by volume) | 66.5 | 69.1 | 67.9 |
| Carbon dioxide | " | 32.5 | 30.1 | 27.2 |
| Steam | " | 0.8 | 0.7 | 4.7 |
| Hydrogen cyanide | (mg/m$^3$)(STP)) | 2 | <0.1 | 3 |
| Melamine | " | 0.2 | <0.05 | 2 |
| Isocyanic acid + urea | " | 75 | 81 | 210 |
| Mean catalyst temperature | (°C.) | 250 | 250 | 200 |
| Space velocity (throughput) | ($h^{-1}$) | 1,000 | 1,250 | 1,200 |
| Minimum operating time | (days) | 180 | 180 | 180 |
| Average destruction of hydrogen cyanide | (%) | 97 | 99–100 | 96 |
| Average destruction of melamine | (%) | 90 | 98–99 | 87.5 |
| Average destruction of isocyanic acid + urea | (%) | 85 | 94 | 85 |
| Catalyst properties: |  |  |  |  |
| Type and form |  | Precipitated catalyst Tablets 4 mm φ | Impregnated catalyst, χ-Al$_2$O$_3$ beads: 5 mm φ | Impregnated catalyst, γ-Al$_2$O$_3$ beads: 3 mm φ |
| Bulk Density | (g/l) | 1,000 | 850 | 700 |
| Specific surface area | (m$^2$/g) | 200 | 250 | 210 |
| Pore volume | (cm$^3$/g) | 0.6 | 0.7 | 0.6 |
| Catalyst composition: |  |  |  |  |
| Copper oxide in % by weight of Cu |  | 30.0 | 4.7 | 3.5 |
| Alumina in % by weight of Al |  | 33.0 | 49.8 | 50.6 |

EXAMPLE 2

2.5 m$^3$ (STP) per hour of the reaction off-gas resulting from the thermal conversion of urea to melamine are passed, under an absolute pressure of 2.0 bar and at 200° C., into the bottom of a cylindrical, steam-heated reactor containing 2 liters of copper oxide catalyst. The catalyst is prepared by impregnating 5 mm χ-alumina beads with copper nitrate solution and contains 4.7% by weight of copper after calcination.

The mean catalyst temperature is 250° C.

Table 1 shows the gas composition upstream and downstream of the reactor, the precise catalyst composition, the operating time, the throughput and the degrees of destruction of the subsidiary components to be removed from the off-gas.

EXAMPLE 4

7,000 m$^3$ (STP) per hour of the off-gas from the thermal conversion of urea to melamine are additionally moistened and passed, under an absolute pressure of 1.2 bar, into the bottom of a reactor containing 10 t of precipitated catalyst. The precise catalyst composition and other process parameters are shown in Table 2.

The composition of the gas mixture upstream and downstream of the catalyst zone is determined once a week by photometric, volumetric and gas-chromatographic methods and gives constant values of 96, 90 and 87% for the destruction of HCN, of melamine and of (HNCO+urea) respectively, over an operating period of about two years.

mixture is from 85 to 95% over a test period of 6 months.

TABLE 2

|  |  | Example 4 | Example 5 | Example 6 |
|---|---|---|---|---|
| Average gas composition upstream of the catalyst zone: | | | | |
| Ammonia | (% by volume) | 67.0 | 66.1 | 63.7 |
| Carbon dioxide | " | 29.0 | 28.8 | 34.1 |
| Steam | " | 3.9 | 5.0 | 2.1 |
| Hydrogen cyanide | (mg/m$^3$)(STP)) | 100 | 67 | 86 |
| Melamine | " | 3 | 2 | 1 |
| Isocyanic acid + urea | " | 800 | 400 | 1,400 |
| Average gas composition downstream of the catalyst zone: | | | | |
| Ammonia | (% by volume) | 67.2 | 66.2 | 63.9 |
| Carbon dioxide | " | 29.1 | 28.9 | 34.2 |
| Steam | " | 3.6 | 4.8 | 1.8 |
| Hydrogen cyanide | (mg/m$^3$)(STP)) | 4 | 2 | 4 |
| Melamine | " | 0.3 | about 0.1 | about 0.1 |
| Isocyanic acid + urea | " | 104 | 36 | 210 |
| Mean catalyst temperature | (°C.) | 250 | 280 | 220 |
| Space velocity (throughput) | (h$^{-1}$) | 700 | 1,200 | 2,000 |
| Minimum operating time | (days) | 700 | 700 | 180 |
| Average destruction of hydrogen cyanide | (%) | 96 | 97 | 95 |
| Average destruction of melamine | (%) | 90 | 95 | 90 |
| Average destruction of isocyanic acid + urea | (%) | 87 | 91 | 85 |
| Catalyst properties: | | | | |
| Form | | Tablets: 9 × 9 mm | Extrudates: 5 × 10 mm | Beads: 6 mm φ |
| Bulk Density | (g/l) | 1,000 | 1,100 | 900 |
| Specific surface area | (m$^2$/g) | 65 | 70 | 120 |
| Pore volume | (cm$^3$/g) | 0.45 | 0.5 | 0.6 |
| Catalyst composition: | | | | |
| Iron oxide in % by weight of Fe | | 57.5 | 69.1 | 30.2 |
| Chromium oxide in % by weight of Cr | | 7.0 | — | — |
| Aluminum oxide in % by weight of Al | | 2.4 | 0.3 | 30.0 |
| Silicon dioxide in % by weight of Si | | — | 0.1 | — |
| Calcium oxide in % by weight of Ca | | — | 0.3 | — |
| Graphite in % by weight of C | | about 3 | — | — |

EXAMPLE 5

The water content of the off-gas from the synthesis of melamine is brought to 5% by volume by addition of steam. This gas mixture is then passed, at a space velocity of 1,200 h$^{-1}$, through a fixed bed reactor which contains 8,000 kg of iron oxide precipitated catalyst in the form of extrudates of about 5 mm diameter and 10 mm length. The gas is under an absolute pressure of 2 bar and leaves the catalyst bed at 276° C. under an absolute pressure of 1.9 bar.

Other process parameters and the exact composition of the catalyst are shown in Table 2.

The gas mixture which is taken off at the top of the reactor and is virtually free from HCN, melamine, HNCO and urea can be used for the synthesis of ammonium nitrate or urea.

EXAMPLE 6

A gas mixture resulting from the preparation of melamine from urea is passed, at a space velocity of 2,000 h$^{-1}$ and under an absolute gas pressure of 4 bar, through a test furnace, the entry temperature being 205° C. The furnace contains 5 l of iron oxide catalyst in the form of beads of about 6 mm diameter.

The exact catalyst composition, other process parameters and the gas analyses upstream and downstream of the furnace are shown in Table 2. At a mean catalyst temperature of 220° C., the destruction of the traces of HCN, melamine, isocyanic acid and urea in the off-gas

EXAMPLE 7

A gas mixture resulting from the preparation of melamine from urea is passed through a cylindrical furnace at a space velocity of 2,000 h$^{-1}$ and under an absolute gas pressure of 2 bar. The furnace contains a mixed copper oxide/iron oxide catalyst in the form of beads of 4 mm diameter. The mean catalyst temperature is 210° C. Other process parameters, and the precise catalyst composition, are shown in Table 3.

Over a test period of 6 months, the destruction of the HCN, melamine, HNCO and urea trace components is from 98 to 87%.

TABLE 3

|  |  | Example 7 |
|---|---|---|
| Average gas composition upstream of the catalyst zone: | | |
| Ammonia | (% by volume) | 66.0 |
| Carbon dioxide | " | 33.0 |
| Steam | " | 1.0 |
| Hydrogen cyanide | (mg/m$^3$)(STP)) | 50 |
| Melamine | " | 1 |
| Isocyanic acid + urea | " | 800 |
| Average gas composition downstream of the catalyst zone: | | |
| Ammonia | (% by volume) | 66.1 |
| Carbon dioxide | " | 33.1 |
| Steam | " | 0.8 |
| Hydrogen cyanide | (mg/m$^3$)(STP)) | 1 |
| Melamine | " | about 0.05 |
| Isocyanic acid + urea | " | 102 |
| Mean catalyst temperature | (°C.) | 210 |
| Space velocity (throughput) | (h$^{-1}$) | 2,000 |
| Minimum operating time | (days) | 180 |
| Average destruction of hydrogen cyanide | (%) | 98 |

TABLE 3-continued

|  |  | Example 7 |
|---|---|---|
| Average destruction of melamine | (%) | 95 |
| Average destruction of isocyanic acid + urea | (%) | 87 |
| Catalyst properties: |  |  |
| Form |  | Beads, 4 mm φ |
| Bulk density | (g/l) | 980 |
| Specific surface area | ($m^2$/g) | 210 |
| Pore volume | ($cm^3$/g) | 0.6 |
| Catalyst composition: |  |  |
| Copper oxide in % by weight of Cu |  | 3.2 |
| Iron oxide in % by weight of Fe |  | 7.5 |
| Aluminum oxide in % by weight of Al |  | 45.1 |

COMPARATIVE EXAMPLE

In order to illustrate the effectiveness of the catalysts according to the invention in the purification of the off-gas from the synthesis of melamine, the reactor described in Example 1 is charged with various catalysts, shown in Table 4 below, which have been disclosed for the removal of hydrogen cyanide from other gas mixtures. The catalysts employed in Experiments 1 and 2 are disclosed in U.S. Pat. No. 2,817,580, those in Experiment 3 in German Laid-Open Application No. DOS 2,341,650 and those in Experiments 5 to 9 in Japanese Laid-Open Application No. 53/005,065.

In all experiments, the mean catalyst temperature is 280° C., the space velocity 1,000 $h^{-1}$ and the period of operation 7 days.

The activity is tested with (a) an off-gas from the synthesis of melamine, containing
66% by volume of ammonia
30% by volume of carbon dioxide
4% volume of steam
100 mg/$m^3$ (STP) of hydrogen cyanide
10 mg/$m^3$ (STP) of melamine
1,000 mg/$m^3$ (STP) of isocyanic acid + urea
and (b) a comparative gas, free from $CO_2$ and $NH_3$, and containing
96% by volume of nitrogen
4 by volume of steam
100 mg/$m^3$ (STP) of hydrogen cyanide
10 mg/$m^3$ (STP) of melamine
1,000 mg/$m^3$ (STP) of isocyanic acid + urea.

The results of these Comparative Experiments are shown in Table 4 below.

TABLE 4

| Experiment No. | Catalyst system | Off gas from the synthesis of melamine ||| Comparative gas, free from carbon dioxide and from ammomia |||
|---|---|---|---|---|---|---|---|
|  |  | Destruction of HCN % | Destruction of melamine % | Destruction of isocyanic acid + urea % | Destruction of HCN % | Destruction of melamine % | Destruction of isocyanic acid + urea % |
| 1 | γ-AlOOH[1] | 20 | 40 | 40 | 95 | 35 | 50 |
| 2 | γ-alumina[1] | 15 | 30 | 37 | 89 | 31 | 54 |
| 3 | Alumina + 10% by weight of KOH[2] | 5 | 70 | 40 | 98 | 70 | 45 |
| 4 | Silica + 5% by weight of NaOH[2] | 2 | 55 | 35 | 50 | 60 | 41 |
| 5 | Molybdenum oxide (6% by weight of Mo), remainder alumina[3] | 17 | 40 | 30 | 80 | 45 | 40 |
| 6 | Cobalt oxide (10% by weight of Co) remainder alumina[3] | 33 | 30 | 10 | 89 | 45 | 35 |
| 7 | Nickel oxide (6% by weight of Ni) remainder alumina[3] | 34 | 32 | 7 | 98 | 66 | 33 |
| 8 | Manganese oxide (7% by weight Mn) remainder alumina[3] | 19 | 41 | 33 | 85 | 51 | 33 |
| 9 | Silver oxide (2% by weight of Ag) remainder alumina[3] | 35 | 60 | 31 | 98 | 60 | 45 |

[1]cf. U.S. Pat. No. 2,817,580
[2]cf. German Laid-Open Application DOS 2,341,690
[3]cf. Japanese Laid-Open Application 53/005,065

Table 4 shows that the catalyst systems listed there, employed in the comparative gas free from carbon dioxide and from ammonia, show one completely unsatisfactory value (Experiment 4) and some not very satisfactory degrees of destruction of hydrogen cyanide (<90%), but also some good values (>90%). However, the destruction of melamine, isocyanic acid and urea is unsatisfactory in every case. On the other hand, all the degrees of destruction of all 3 components are completely inadequate in the case of the off-gas from the synthesis of melamine. The Table shows very clearly that the effectiveness of the catalysts depends greatly on the composition of the off-gas to be treated and that initially present high proportions of the hydrolysis products of the trace components have an adverse influence on the effectiveness.

We claim:

1. A process for the simultaneous destruction of the trace components hydrogen cyanide, isocyanic acid, urea and melamine in the reaction off-gas, consisting mainly of ammonia and carbon dioxide, which are left after thermal conversion of urea to melamine and isolation of the melamine, wherein the off-gas is passed over a catalyst, containing copper oxide and/or iron oxide, in the presence of steam at from 100° to 500° C.

2. A process as claimed in claim 1, wherein the copper oxide and/or iron oxide is applied to a carrier.

3. A process as claimed in claim 2, wherein the catalyst contains not less than 0.5% by weight of copper.

4. A process as claimed in claim 2, wherein the catalyst contains not less than 5% by weight of iron.

5. A process as claimed in claim 2, wherein the carrier is a ceramic oxide.

6. A process as claimed in claim 2, wherein the carrier contains from 5 to 25% by weight of chromium oxide ($Cr_2O_3$).

7. A process as claimed in claim 1, wherein the treatment is carried out at from 150° to 300° C.

8. A process as claimed in claim 1, wherein the off-gas is passed over the catalyst at a space velocity of from 100 to 10,000 $h^{-1}$.

* * * * *